United States Patent
Xu et al.

(10) Patent No.: US 8,041,021 B2
(45) Date of Patent: Oct. 18, 2011

(54) METHODS, SYSTEMS, AND COMPUTER PROGRAM PRODUCTS FOR SELECTING A GLOBAL TITLE TRANSLATION MODE BASED ON AN ORIGINATOR OF A SIGNALING MESSAGE AND PERFORMING GLOBAL TITLE TRANSLATION ACCORDING TO THE SELECTED MODE

(75) Inventors: Michael Y. Xu, Raleigh, NC (US); Michael Kaplan, Cary, NC (US); Raghavendra G. Rao, Cary, NC (US)

(73) Assignee: Tekelec, Morrisville, NC (US)

( * ) Notice: Subject to any disclaimer, the term of this patent is extended or adjusted under 35 U.S.C. 154(b) by 988 days.

(21) Appl. No.: 11/217,100

(22) Filed: Aug. 31, 2005

(65) Prior Publication Data
US 2007/0003041 A1    Jan. 4, 2007

Related U.S. Application Data (60) Provisional application No. 60/690,165, filed on Jun. 13, 2005.

(51) Int. Cl.
*H04M 7/00* (2006.01)
(52) U.S. Cl. ............ 379/221.08; 379/230; 379/221.04; 379/220.01; 379/221.09; 379/221.12
(58) Field of Classification Search .................. 379/230, 379/142, 133, 207, 220.01, 221.01, 221.04, 379/221.09, 221.12, 219, 201, 113–115, 379/134, 211–212, 221.08; 370/401, 254–258, 370/352–356, 385, 389, 467
See application file for complete search history.

(56) References Cited

U.S. PATENT DOCUMENTS

| | | | |
|---|---|---|---|
| 4,577,066 A | 3/1986 | Bimonte et al. | |
| 4,752,924 A | 6/1988 | Darnell et al. | |
| 4,756,019 A | 7/1988 | Szybicki | |
| 4,757,267 A * | 7/1988 | Riskin ...................... | 379/114.24 |
| 5,008,929 A | 4/1991 | Olsen et al. | |
| 5,384,840 A | 1/1995 | Blatchford et al. | |

(Continued)

FOREIGN PATENT DOCUMENTS
EP    0 912 068 A2    4/1999
(Continued)

OTHER PUBLICATIONS

Fudge, Method and Apparatus for Synthetic Global Title Translation in an SS7 Network, U.S. Appl. No. 60/631,694, filed Nov. 30, 2004—as included in a PDF format.*

(Continued)

*Primary Examiner* — Vivian Chin
*Assistant Examiner* — Paul Kim
(74) *Attorney, Agent, or Firm* — Jenkins, Wilson, Taylor & Hunt, P.A.

(57) ABSTRACT

The subject matter disclosed herein includes methods, systems, and computer program products for selecting among different global title translation modes based on a message originator and performing global title translation based on the selected mode. According to one method, a global title translation mode is selected based on a message originator. A global title translation lookup is performed in accordance with the selected mode. If the global title translation according to the selected mode fails, a lookup may be performed according to at least one additional mode in a global title translation mode hierarchy.

33 Claims, 4 Drawing Sheets

U.S. PATENT DOCUMENTS

| | | | |
|---|---|---|---|
| 5,481,673 A | 1/1996 | Michelson | |
| 5,583,848 A | 12/1996 | Glitho | |
| 5,592,477 A | 1/1997 | Farris et al. | |
| 5,592,530 A | 1/1997 | Brockman et al. | |
| 5,615,254 A | 3/1997 | Qiu et al. | |
| 5,708,702 A | 1/1998 | De Paul et al. | |
| 5,862,129 A | 1/1999 | Bell et al. | |
| 5,898,667 A | 4/1999 | Longfield et al. | |
| 5,926,482 A | 7/1999 | Christie et al. | |
| 6,175,574 B1 | 1/2001 | Lewis | |
| 6,226,289 B1 | 5/2001 | Williams et al. | |
| 6,253,146 B1 | 6/2001 | Hanson et al. | |
| 6,282,191 B1 | 8/2001 | Cumberton et al. | |
| 6,327,267 B1* | 12/2001 | Valentine et al. | 370/466 |
| 6,327,270 B1 | 12/2001 | Christie et al. | |
| 6,470,080 B2 | 10/2002 | Perlmutter | |
| 6,496,577 B1 | 12/2002 | Kajitani | |
| 6,529,524 B1* | 3/2003 | Liao et al. | 370/467 |
| 6,535,746 B1 | 3/2003 | Yu et al. | |
| 6,577,723 B1* | 6/2003 | Mooney | 379/221.08 |
| 6,662,017 B2 | 12/2003 | McCann et al. | |
| 6,731,741 B1* | 5/2004 | Fourcand et al. | 379/230 |
| 6,747,955 B1 | 6/2004 | Archer | |
| 6,757,538 B1 | 6/2004 | Howe | |
| 6,792,100 B2 | 9/2004 | Nekrasovskaia et al. | |
| 6,836,477 B1 | 12/2004 | West, Jr. et al. | |
| 6,842,506 B1 | 1/2005 | Bedingfield | |
| 6,954,526 B1* | 10/2005 | Glenn et al. | 379/220.01 |
| 6,978,781 B1 | 12/2005 | Jordan | |
| 6,996,225 B1 | 2/2006 | Bordonaro et al. | |
| 7,058,724 B1 | 6/2006 | Das et al. | |
| 7,065,200 B2 | 6/2006 | Lim | |
| 7,088,728 B2 | 8/2006 | Delaney et al. | |
| 7,116,774 B2 | 10/2006 | Gradischnig | |
| 7,260,086 B2 | 8/2007 | Delaney et al. | |
| 7,349,343 B2 | 3/2008 | Shipman | |
| 7,372,953 B2 | 5/2008 | Delaney et al. | |
| 7,466,815 B2 | 12/2008 | Delaney et al. | |
| 7,743,131 B2 | 6/2010 | Brendes et al. | |
| 2001/0049730 A1 | 12/2001 | Brendes et al. | |
| 2002/0071543 A1 | 6/2002 | Williams | |
| 2002/0131427 A1 | 9/2002 | Niermann | |
| 2002/0186702 A1 | 12/2002 | Ramos et al. | |
| 2003/0067929 A1 | 4/2003 | Matsuzawa | |
| 2003/0169867 A1 | 9/2003 | Nekrasovskaia et al. | |
| 2003/0206562 A1 | 11/2003 | Yi | |
| 2004/0081206 A1 | 4/2004 | Allison et al. | |
| 2004/0114533 A1 | 6/2004 | Angermayr et al. | |
| 2004/0137904 A1 | 7/2004 | Gradischnig | |
| 2004/0141493 A1 | 7/2004 | Delaney et al. | |
| 2004/0141514 A1 | 7/2004 | Delaney et al. | |
| 2004/0240658 A1 | 12/2004 | Delaney et al. | |
| 2004/0257983 A1 | 12/2004 | Kopp et al. | |
| 2004/0264675 A1 | 12/2004 | Delaney et al. | |
| 2005/0099964 A1 | 5/2005 | Delaney et al. | |
| 2005/0152383 A1 | 7/2005 | Schantz | |
| 2005/0254430 A1 | 11/2005 | Clark et al. | |
| 2006/0115069 A1* | 6/2006 | Fudge et al. | 379/230 |
| 2006/0203987 A1 | 9/2006 | Angermayr et al. | |
| 2007/0217391 A1 | 9/2007 | Hildebrand et al. | |
| 2007/0286083 A1 | 12/2007 | Hildebrand et al. | |
| 2008/0013446 A1 | 1/2008 | Xu et al. | |
| 2008/0101248 A1 | 5/2008 | Hildebrand et al. | |

FOREIGN PATENT DOCUMENTS

| | | |
|---|---|---|
| EP | 1 111 940 A1 | 6/2001 |
| EP | 1 397 009 B1 | 8/2005 |
| WO | WO 97/11563 | 3/1997 |
| WO | WO 99/67928 | 12/1999 |
| WO | WO 2005/002068 A2 | 1/2005 |
| WO | WO 2005/011174 A2 | 2/2005 |
| WO | WO 2008/054458 A1 | 5/2008 |
| WO | WO 2008/105976 A1 | 9/2008 |

OTHER PUBLICATIONS

Notification of Transmittal of the International Search Report and the Written Opinion of the International Searching Authority, or the Declaration for International Application No. PCT/US06/22875 (Sep. 13, 2007).
Interview Summary for U.S. Appl. No. 11/413,611 (Apr. 29, 2010).
Final Official Action for U.S. Appl. No. 11/786,763 (Apr. 26, 2010).
Interview Summary for U.S. Appl. No. 11/786,763 (Jan. 26, 2010).
Non-Final Official Action for U.S. Appl. No. 11/605,941 (Jan. 5, 2010).
Non-Final Official Action for U.S. Appl. No. 11/413,611 (Dec. 23, 2009).
Final Official Action for U.S. Appl. No. 11/510,120 (Nov. 13, 2009).
Official Action for U.S. Appl. No. 11/786,763 (Aug. 6, 2009).
Restriction and/or Election Requirement for U.S. Appl. No. 11/605,941 (Jun. 2, 2009).
Non-Final Official Action for U.S. Appl. No. 11/510,120 (Feb. 25, 2009).
Notice of Allowance and Fee(s) Due for U.S. Appl. No. 10/609,094 (Oct. 20, 2008).
Notification of Transmittal of the International Search Report and Written Opinion of the International Searching Authority, or the Declaration for International Application No. PCT/US04/16550 (Jul. 28, 2008).
Notification of Transmittal of the International Search Report and the Written Opinion of the International Searching Authority, or Declaration for International Application No. PCT/US04/20141 (Jul. 8, 2008).
Non-Final Official Action for U.S. Appl. No. 10/609,094 (Feb. 6, 2008).
Notification of Transmittal of the International Search Report and Written Opinion of the International Searching Authority, or the Declaration corresponding to PCT application No. PCT/US07/04324 (Feb. 4, 2008).
Communication of European Publication Number and Information on the Application of Article 67(3) EPC for European Application No. 06772964.0 (Jan. 30, 2008).
Notice of Allowance and Fee(s) Due for U.S. Appl. No. 10/446,424 (Jan. 7, 2008).
Official Action for U.S. Appl. No. 10/446,424 (Jul. 6, 2007).
Notification of European Publication Number and Information on the Application of Article 67(3) EPC for European Application No. 04776970.8 (Mar. 1, 2006).
Notification of European Publication Number and Information on the Application of Article 67(3) EPC for European Application No. 04753391.4 (Feb. 1, 2006).
Erdman et al., "Cisco Access Control Lists (ACL)," Digital Foundation, pp. 1-3 (Dec. 14, 2005).
George et al., "Signaling System 7 (SS7) Message Transfer Part 2 (MTP2)—User Peer-to-Peer Adaptation Layer (M2PA)," RFC 4165, pp. 1-50 (Sep. 2005).
Wikipedia, "Default Route," http://web.archive.org/web/20050123203639/en.wikipedia.org/wiki/Default_route> (Jan. 23, 2005).
Loughney et al., "Signalling Connection Control Part User Adaptation Layer (SUA)," RFC 3868, pp. 1-123 (Oct. 2004).
GR-310-CORE, "CSS Operations System (CCS OS)—STP Interface Specification," Issue 3, Telcordia Technologies, pp. 2-3, 7-1-7-14, 7-23-7-24, 8-25, 7-148-7-152, 7-316-7-320, 12-4-12-9, and B10 (Dec. 2003).
Sidebottom et al., "Signaling System 7 (SS7) Message Transfer Part 3 (MTP3)—User Adaptation Layer (M3UA)," RFC 3332, pp. 1-113 (Sep. 2002).
GR-82-CORE, "Signaling Transfer Point (STP) Generic Requirements," Issue 5, Telcordia Technologies, pp. 2-5-2-10, 3-2-3-3, 4-2-4-103, D-1-D-30, and J-21-J28 (Dec. 2001).
Sprague et al., "Tekelec's Transport Adapter Layer Interface," RFC 3094, pp. 1-107 (Apr. 2001).
Russell, "Signaling System #7," Third Edition, pp. 233 and 235 (Copyright 2000).
Manfield et al., "Congestion Controls in SS7 Signaling Networks," IEEE Communications Magazine (Jun. 1993).
Official Action for U.S. Appl. No. 11/605,941 (Aug. 18, 2010).
Non-Final Official Action for U.S. Appl. No. 11/413,611 (Jul. 9, 2010).

Non-Final Official Action for U.S. Appl. No. 11/510,120 (Jul. 9, 2010).
First Office Action for Chinese Patent Application No. 200680028656.8 (May 10, 2010).
Notice of Allowance for U.S. Appl. No. 10/397,774 (Jun. 28, 2007).
Official Action for U.S. Appl. No. 10/397,774 (Mar. 6, 2007).
Supplemental Notice of Allowability for U.S. Appl. No. 10/345,632 (Jul. 3, 2006).
Supplemental Notice of Allowability for U.S. Appl. No. 10/345,632 (May 2, 2006).
Notice of Allowance and Fee(s) Due for U.S. Appl. No. 10/345,632 (Apr. 11, 2006).
Supplementary European Search Report in European Application No. EP 04 70 2497 (Feb. 13, 2006).
Official Action for U.S. Appl. No. 10/345,632 (Sep. 8, 2005).
Notification Concerning Transmittal of International Preliminary Report on Patentability (Chapter 1 of the Patent Cooperation Treaty) in International Application No. PCT/US2004/001004 (Aug. 4, 2005).
European Search Report in European Application No. EP 04 70 2535 (Apr. 10, 2006).
Supplementary European Search Report in European Application No. EP 04 70 2535 (Mar. 22, 2006).
Official Action for U.S. Appl. No. 10/345,632 (Nov. 16, 2004).
"Chapter 2: The Networker's Guide to TCP/IP; Layer 3: IP Protocol," M.J.: Understanding the Network: A Practical Guide to Internetworking, pp. 1-16 (2000).
Jabbari, "Routing and Congestion Control in Common Channel Signaling System No. 7," Proceedings of the IEEE, vol. 80, No. 4, pp. 607-617 (Apr. 1992).
Notice of Abandonment for U.S. Appl. No. 11/786,763 (Mar. 28, 2011).
Final Official Action for U.S. Appl. No. 11/416,611 (Mar. 15, 2011).
Final Official Action for U.S. Appl. No. 11/510,120 (Mar. 2, 2011).
Notice of Allowance and Fee(s) Due for U.S. Appl. No. 11/786,763 (Dec. 13, 2010).
Interview Summary for U.S. Appl. No. 11/413,611 (Dec. 3, 2010).
Communication pursuant to Article 94(3) EPC for European Application No. 04 702 497.1 (Sep. 22, 2010).
Communication pursuant to Article 94(3) EPC for European Application No. 04 753 391.4 (Sep. 13, 2010).
European Search Report for European Application No. 06772964.0 (Sep. 3, 2010).
European Search Report for European Application No. 04753391.4 (May 6, 2010).
Notification of Transmittal of the International Search Report and the Written Opinion of the International Searching Authority, or the Declaration in International Application No. PCT/US04/00999 (Apr. 6, 2005).
Commonly-assigned, co-pending U.S. Appl. No. 10/397,774 for "Methods and Systems for Global Title Translation Using Message Origination Information," (Unpublished, filed Mar. 26, 2003).

* cited by examiner

METHODS, SYSTEMS, AND COMPUTER PROGRAM PRODUCTS FOR SELECTING A GLOBAL TITLE TRANSLATION MODE BASED ON AN ORIGINATOR OF A SIGNALING MESSAGE AND PERFORMING GLOBAL TITLE TRANSLATION ACCORDING TO THE SELECTED MODE

RELATED APPLICATIONS

This application claims the benefit of U.S. Provisional Patent Application Ser. No. 60/690,165, filed Jun. 13, 2005, the disclosure of which is incorporated herein by reference in its entirety.

TECHNICAL FIELD

The subject matter described herein relates to performing global title translation (GTT). More particularly, the subject matter described herein relates to methods, systems, and computer program products for selecting a GTT mode from a plurality of different GTT modes based on a message originator and for performing GTT in accordance with the selected mode.

BACKGROUND ART

Within a signaling system 7 (SS7) network, the signaling connection control part (SCCP) protocol is used for accessing databases and other entities within the network. The SCCP protocol also provides an advanced addressing capability where a subsystem is represented as an array of digits known as a global title address. By utilizing global title translation, the SS7 point code (PC) and subsystem number (SSN) of a final destination are not required to be known by the message originator. All the originator is required to know is the called party dialed digits and the address of a node that can perform the global title translation. Global title translation is commonly employed to locate databases that provide 800 number toll free and caller ID services within telecommunications networks. Depending on network topology, global title translation processing is typically performed at a signal transfer point (STP), a signaling gateway (SG), or a service control point (SCP) where one network makes an inter-connection to an adjacent network.

The addressing information used to facilitate message routing at the SCCP level commonly includes a destination point code, a subsystem number, and optionally a global title. If a destination PC and SSN are not specified in the SCCP portion of an SS7 message, global title translation may be used to resolve a global title address (GTA), translation type (TT), and/or global title indicator (GTI) contained in the message to a destination point code and subsystem number.

In addition to called party global title translation where global title translation is based on the SCCP called party address, methods for calling party global title translation have been developed. For example, in U.S. patent application Ser. No. 10/397,774, filed Mar. 26, 2003, the disclosure of which is incorporated herein by reference in its entirety, methods for performing calling party global title translation are described. In addition to performing called or calling party global title translation, there may be a need to combine these methods. However, there is currently no implementation known that combines calling and called party global title translation. Moreover, there may be a need to perform different types of global title translation based on the originator of a message. However, conventional global title translation requires that the same type of global title translation be performed for all signaling messages that require global title translation. Accordingly, there exists a long felt need for selecting a global title translation mode based on an originator of a signaling message and performing global title translation according to the selected mode.

SUMMARY

According to one aspect, a method for global title translation includes receiving a signaling message that requires global title translation. A GTT mode is selected from a plurality of different GTT modes based on an originator of the signaling message. A lookup is performed in a GTT database according to the selected GTT mode. By selecting a GTT mode based on an originator of a signaling message, different GTT modes can be selected for different message originators.

The subject matter described herein for selecting a global title translation mode based on an originator of a signaling message and performing global title translation according to the selected mode may be implemented using a computer program product comprising computer executable instructions embodied in a computer readable medium. Exemplary computer readable media suitable for implementing the subject matter described herein include disk memory devices, programmable logic devices, application specific integrated circuits, and downloadable electrical signals. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
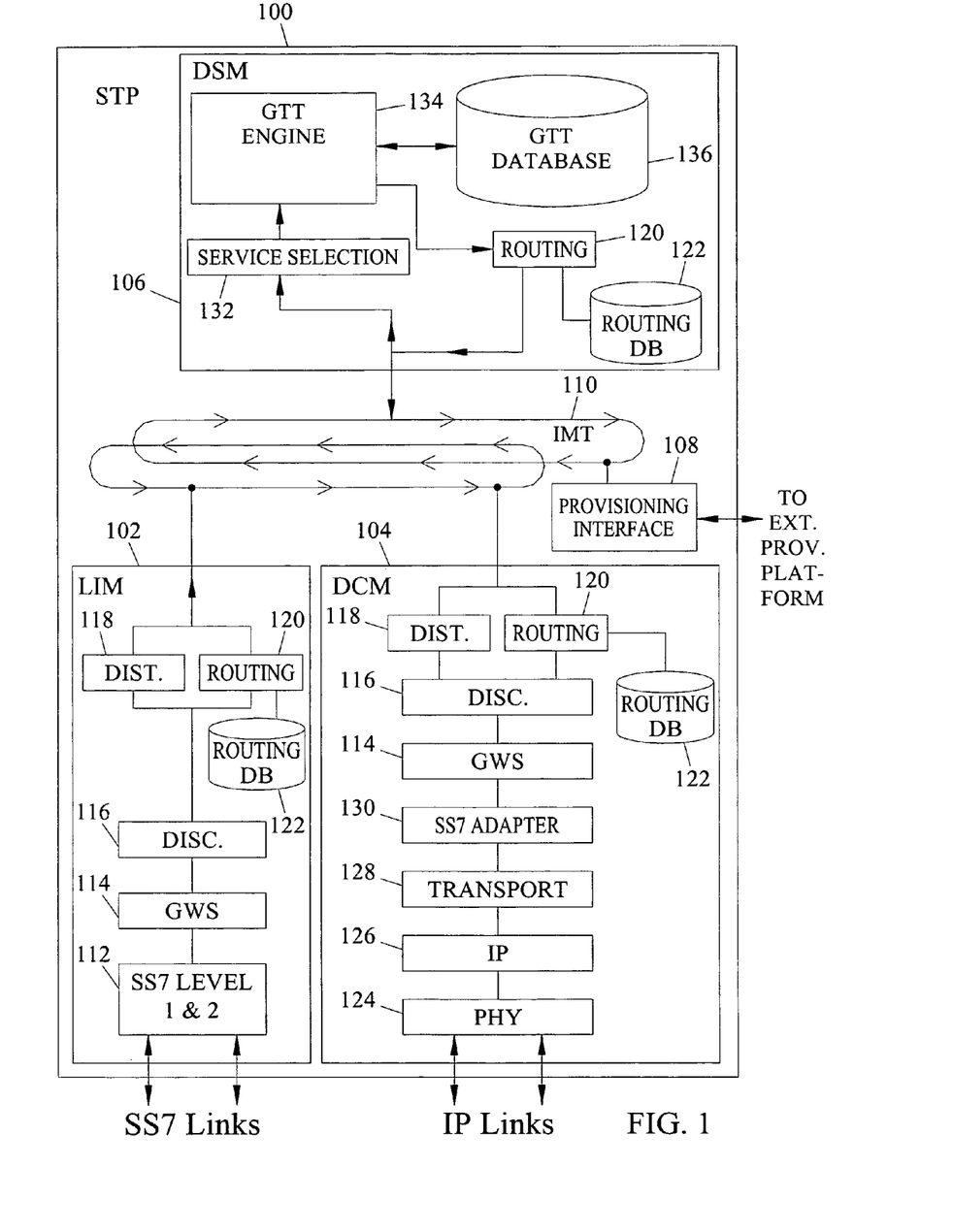
FIG. 1 is a block diagram of a signal transfer point capable of performing GTT according to a plurality of different modes according to an embodiment of the subject matter described herein.

The subject matter described herein includes methods, systems, and computer program products for selecting a global title translation mode for a message and for performing GTT according to the selected mode. FIG. 1 illustrates a signal transfer point (STP) 100 for performing global title translation according to a plurality of different GTT modes of an embodiment of the subject matter described herein. Referring to FIG. 1, STP 100 includes a plurality of internal processing modules for routing and processing SS7 messages. In the illustrated example, STP 100 includes a link interface module (LIM) 102 for sending and receiving SS7 messages via SS7 signaling links, a data communications module (DCM) 104 for sending and receiving SS7 messages via IP signaling links, a database services module (DSM) 106 for performing database related services, and a provisioning interface 108 for allowing an external system to provision databases within STP 100. In the illustrated example, modules 102, 104, and 106 and interface 108 are connected via a counter-rotating, dual-ring bus 110.

SS7 LIM 102 includes an SS7 level one and two module 112 for performing SS7 level one and two functions, such as error detection, error correction, and sequencing of SS7 messages. Gateway screening module 114 determines whether to allow messages into a network. Discrimination module 116 analyzes destination point codes in a message to determine whether further processing is required for the messages or whether the messages are to be through-switched. Distribution module 118 distributes messages identified by discrimination module 116 as requiring further processing to other internal processing modules for the processing to be performed. Routing module 120 routes messages identified by discrimination module 116 as being destined for other signaling nodes. Routing module 120 may access a routing database 122 to route the messages.

DCM 104 includes a physical layer 124 for performing physical layer functions for IP signaling links. Internet protocol layer 126 performs IP layer functions, such as IP forwarding. Transport layer 128 performs transport layer functions, such as TCP, UDP or SCTP functions. SS7 adapter layer 130 performs functions for adapting SS7 traffic to be sent and/or received over an IP network. Gateway screening module 114, distribution module 118, routing module 120, and routing database 122 perform the same functions as those described above with regard to LIM 102. Hence a description of these functions will not be repeated herein.

Database services module 106 includes a service selection module 132 for selecting a service for messages identified as requiring further internal processing. For purposes of explanation of the subject matter described herein, the selected service is assumed to be global title translation. Service selection may be performed based on one or more parameters in a signaling message, such as SCCP parameters including translation type, nature of address indicator, routing indicator, global title indication, number plan, etc. Global title translation engine 134 can select a global title translation mode from a plurality of different GTT modes based on a message attribute, such as message originator, and perform global title translation according to the selected global title translation mode. The message originator used for selecting the global title translation mode can be identified based on incoming linkset of the message, an OPC of the signaling message, a calling party address of the message, or any other suitable information indicating the source of the received message.

The different GTT modes require searching a global title translation database 136 based on different matching criteria or qualifiers for translation matching of a signaling message to an entry in database 136. Further, the different GTT modes can be ordered in a hierarchy. The different GTT modes can be utilized in a hierarchical order until a GTT mode is found which provides a matching translation in database 136 for the signaling message. For example, global title translation may first be attempted using a first GTT mode. If global title translation using the first GTT mode fails, GTT may be performed based on the remaining the GTT modes where the modes are executed in a hierarchical order from the most preferred mode to the least preferred mode.

Global title translation according to the selected global title translation mode can be based on the calling party address, the called party address, the OPC, the GTI, the SSN, or other suitable information in a received message. Global title translation database 136 may include data structures for performing global title translation according to a selected global title translation mode. When a match entry is found in database 136, the message undergoing GTT is modified to include data from the matching entry. The data may include the point code of a destination node for final GTT or an intermediate node for intermediate GTT. Next, routing function 120 and routing database 122 can receive and route the message to a destination based on the inserted destination point code. Routing function 120 and routing database 122 can perform similar functions to those described with regard to LIM 102. Hence, a description thereof will not be repeated herein.

Exemplary GTT modes that may be implemented by GTT engine 134 include advanced called party (CdPA) GTT, CdPA GTT, and calling party (CgPA) GTT. Table 1 below shows an example of acceptable combinations of GTT selection qualifiers used by the advanced CdPA mode.

TABLE 1

Acceptable Advanced CdPA GTT Qualifier Combinations and Order of Preference

| GTT Selection Qualifier - Order of Preference | CdPA GTA | CgPA GTA | CgPA NP | OPC | CgPA PC | CgPA SSN |
| --- | --- | --- | --- | --- | --- | --- |
| 1. (most preferred) | MATCH | MATCH | MATCH | | | MATCH |
| 2. | MATCH | MATCH | MATCH | | | |
| 3. | MATCH | MATCH | | | | MATCH |
| 4. | MATCH | MATCH | | | | |
| 5. | MATCH | | | | MATCH | MATCH |
| 6. | MATCH | | | | MATCH | |
| 7. | MATCH | | | MATCH | | MATCH |
| 8. (least preferred) | MATCH | | | MATCH | | |

Table 1 also shows the order of preference for the qualifier combinations. In Table 1, GTT is performed based on the parameters corresponding to the row with which a received message has the most matching parameters. From Table 1, it can be seen that advanced called party GTT can be performed based on called party parameters, such as the SCCP called party address, calling party parameters, such as the SCCP calling party address, and/or message transfer part (MTP) parameters, such as the originating point code (OPC).

Table 2 shown below illustrates exemplary selection qualifiers in order of preference used for calling party GTT.

TABLE 2

Acceptable CgPA GTT Qualifier Combinations and Order of Preference

| GTT selection qualifier Order of Preference | CgPA GTA | CgPA PC | CgPA SSN |
|---|---|---|---|
| 1. (most preferred) | MATCH | | MATCH |
| 2. | MATCH | | |
| 3. | | MATCH | MATCH |
| 4. (least preferred) | | MATCH | |

From Table 2, it can be seen that calling party GTT is performed based on the calling party global title address, calling party point code, and calling party subsystem number.

In performing GTT according to the called party GTT mode, GTT may be performed based on the called party address. This is the conventional manner in which GTT is performed. Hence, further description thereof will not be repeated herein.

Table 3 below shows different exemplary GTT mode hierarchies that may be available on an STP.

TABLE 3

GTT Mode Hierarchies

GTT Mode Hierarchies

1. CdPA only
2. Adv. CdPA, CdPA
3. CgPA, Adv. CdPA, CdPA
4. Adv. CdPA, CgPA, CdPA
5. Adv. CdPA, CdPA, CgPA
6. CgPA, CdPA
7. CdPA, CgPA
8. CgPA only According to an aspect of the subject matter described herein, an operator of an STP can specify, for example, on an incoming linkset basis, the GTT mode hierarchy that the STP follows when performing GTT. If the hierarchy specified by the operator for a particular incoming linkset contains multiple GTT modes, the STP can go through each GTT mode in order until a matching translation is found. Table 3 includes 8 different hierarchies, numbered 1-8. An operator may select one or more of these hierarchies. For example, if an operator selects hierarchy number 4 of Table 3, the STP follows the order of advanced CdPA, CgPA GTT, and CdPA GTT. An operator may also define his or her own hierarchy in which GTT modes are executed in the order preferred in the operator's network.

Figure 2A:
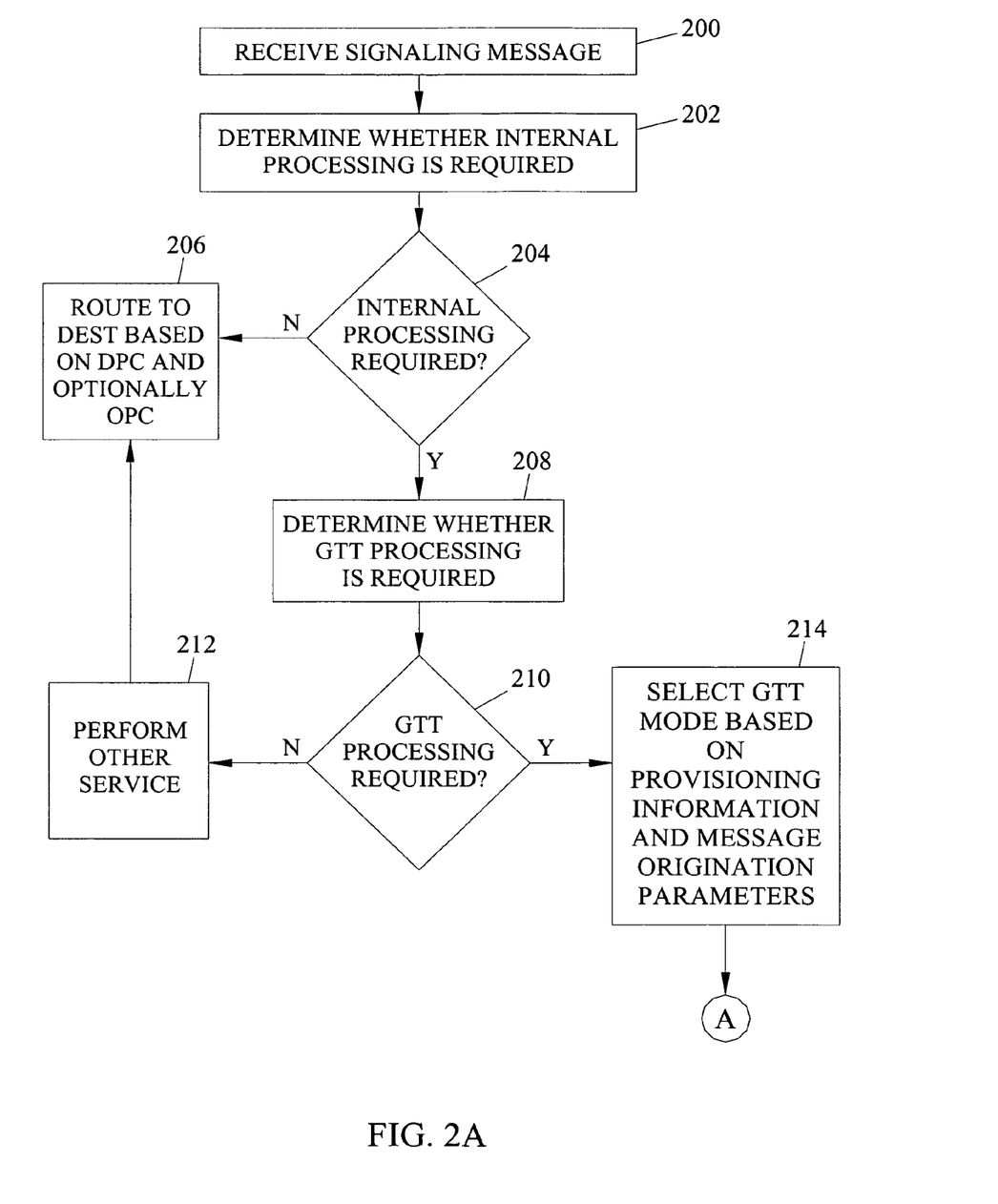
FIGS. 2A and 2B are a flow chart illustrating exemplary steps for performing GTT according to a plurality of different modes according to an embodiment of the subject matter described herein.
Figure 2B:
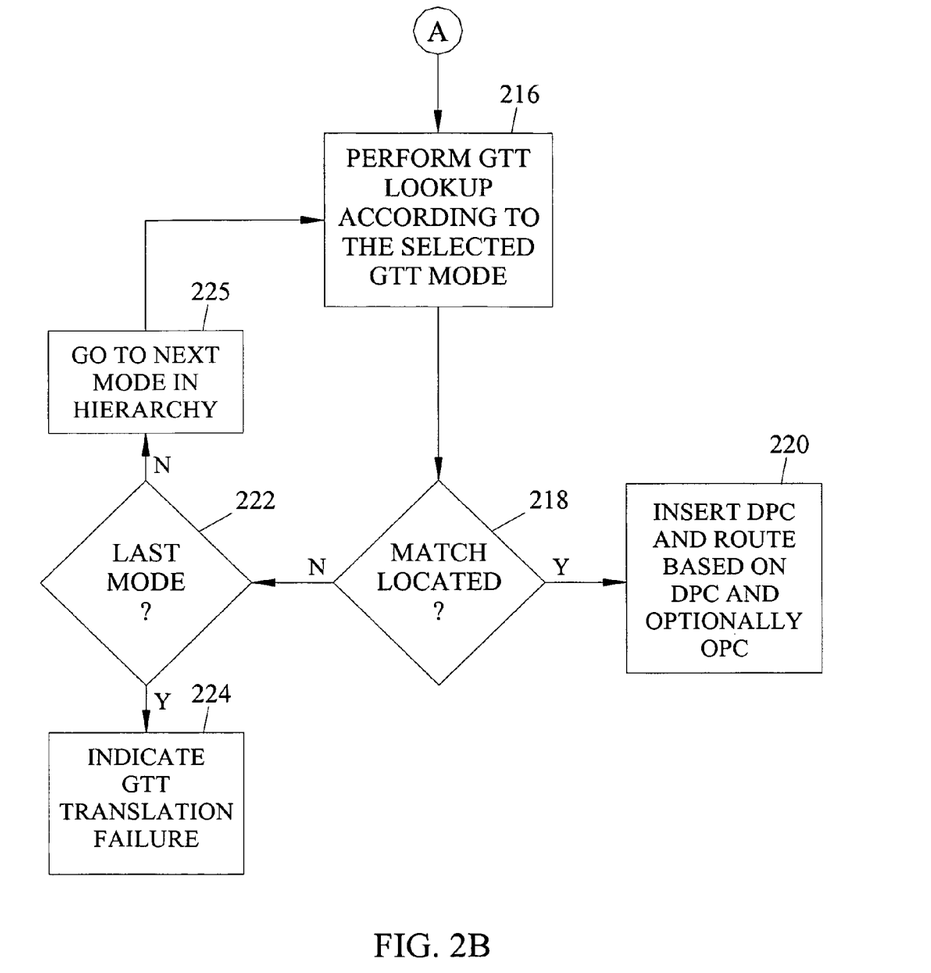

FIGS. 2A and 2B are a flow chart illustrating exemplary steps performed by STP 100 in performing global title translation according to an embodiment of the subject matter described herein. Referring to FIG. 2A, in step 200, STP 100 receives a signaling message. In step 202, discrimination module 116 determines whether further internal processing is required. In step 204, if further internal processing is not required, control proceeds to step 206 where the message is routed to its intended destination based on the destination point code or optionally the originating point code-destination point code combination. In step 204, if discrimination module 116 determines that further internal processing is required, the message is forwarded to DSM 106. In step 208, service selection module 132 of DSM 106 determines whether GTT processing is required. In step 210, if GTT processing is not required, control proceeds to step 212 where another selected service is performed for the message and the message is routed to its intended destination.

In step 210, if GTT processing is determined to be required, control proceeds to step 214 where a GTT mode is selected based on provisioning information and message origination parameters. For example, an operator may provision all three of the above-described modes to be performed in a hierarchical order for a given linkset. Referring to FIG. 2B, in step 216, a GTT lookup is performed according to the selected mode. For example, if the selected mode is advanced called party GTT, the lookup may be performed using the parameters and orders specified in Table 1. If calling party GTT is the selected mode for the linkset, the GTT lookup may be performed based on the calling party parameters and orders specified in Table 2. If called party GTT is selected, the GTT may be performed using the SCCP called party address.

Once the initial GTT lookup is performed, control proceeds to step 218 where it is determined whether a match was located. If a match was located, control proceeds to step 220 where the destination point code from the entry is inserted in the message and the message is routed based on the DPC and optionally the OPC. If a match is not located, control proceeds to step 222 where it is determined whether the current mode is the last mode defined for this linkset. If the current mode is the last mode and the translation failed, control proceeds to step 224 where a GTT translation failure is indicated. If the current mode is not the last mode, control proceeds to step 225 where the next mode in the hierarchy is selected. Control then returns to step 218 and steps 220-225 are repeated for the next mode. Thus, the steps in FIG. 2 illustrate that GTT can be performed according to a plurality of different modes and that modes can be organized according to predetermined hierarchy.

Figure 3:
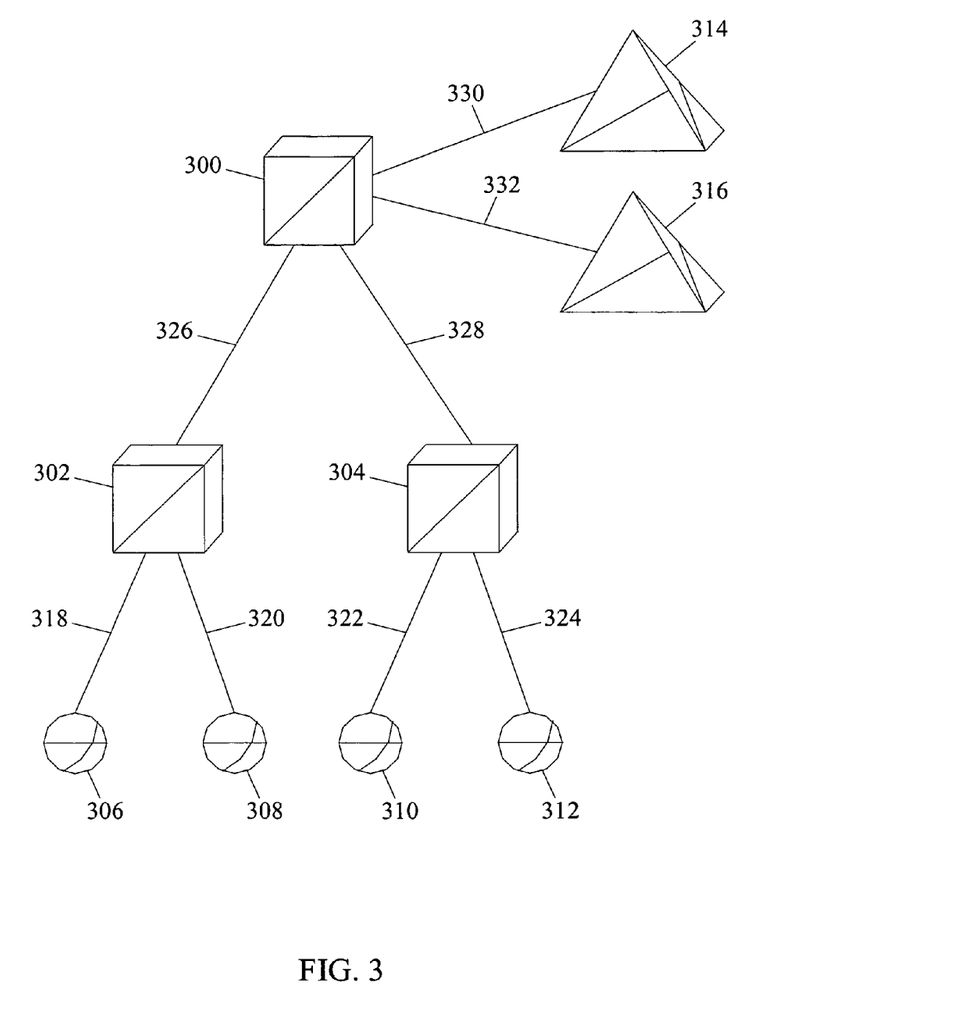
FIG. 3 is a network diagram illustrating an exemplary operating environment in which may be desirable to perform GTT according to a plurality of different modes using the subject matter described herein.

FIG. 3 illustrates an SS7 network in which global title translation according to the subject matter described herein may be implemented. Referring to FIG. 3, the SS7 network includes STPs 300, 302, and 304 for communicating signaling traffic between SSPs 306, 308, 310, and 312 and SCPs 314 and 316. Signaling messages may be communicated between STP 300 and SSPs 306, 308, 310, and 312 on linksets 318, 320, 322, 324, 326, and 328. STP 300 may be connected to SCPs 314 and 316 by linksets 330 and 332.

In FIG. 3, SCP databases 314 and 316 may represent different applications. SCPs 314 and 316 may have the same global title address. Customers connected to end offices 306, 308, 310, and 312 may forward query messages to SCPs 314 and 316. STPs 302 and 304 may perform intermediate global title translation for the query messages to route the messages to STP 300. In order to determine the appropriate application to which a message should be forwarded, STP 300 may perform calling party GTT for messages originating on linksets 326 and 328. For example, it may be desirable to route all query messages from SSPs 306 and 308 to SCP 314. In a similar manner, it may be desirable to route all messages from SSPs 310 and 312 to SCP 316. This can be accomplished by performing calling party GTT for messages received via linksets 326 and 328. In order for applications on SCPs 314 and 316 to send messages back to the proper SSP, it may be desirable that STP 300 to perform advanced called party global title translation so that the response messages will be routed to STPs 302 and 304 for final global title translation. STPs 302 and 304 may then perform final global title translation using the called party GTT mode of operation.

The subject matter described herein is not limited to the GTT modes described above or using the parameters described above to select among GTT modes. For example, GTT modes may be selected and GTT may be performed using any user-specified parameters, including MTP, SCCP, TCAP, and or MAP parameters. Examples of such parameters include optional SCCP parameters, such as XUDT sequence numbers, TCAP parameters, such as opcode, and message type (begin, invoke, return result, and end). In addition, GTT modes may be selected based on non-message criteria, such as time of day.

The subject matter described herein for performing GTT using different modes is not limited to providing a GTT destination address as the result of the GTT. For example, GTT tables may be configured such that the GTT result is discard message, copy message, or send error message, without departing from the scope of the subject matter described herein.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for global title translation (GTT) in a telecommunications network, the method comprising:
   (a) receiving a signaling message that contains a global title address (GTA);
   (b) selecting a GTT mode from a plurality of different GTT modes based on an attribute of the received signaling message, wherein at least some of the different GTT modes use different combinations of address parameters associated with received signaling messages to search a GTT database, and wherein each of the different GTT modes uses at least a signaling connection control part (SCCP) parameter from the received signaling message to determine at least a message transfer part (MTP) destination point code; and
   (c) searching the GTT database using a combination of address parameters of the received signaling message specific to the selected GTT mode.

2. The method of claim 1 wherein receiving a signaling message includes receiving an SS7 signaling message.

3. The method of claim 1 wherein receiving a signaling message includes receiving an SCCP message.

4. The method of claim 1 wherein selecting a GTT mode from a plurality of different GTT modes based on an attribute of the received signaling message includes selecting a GTT mode based on at least one of an incoming linkset of the received signaling message and an address parameter of the received signaling message.

5. The method of claim 1 wherein searching the GTT database using a combination of address parameters of the received signaling message specific to the selected GTT mode includes searching the GTT database using at least one of: an incoming linkset of the received signaling message, an origination point code (OPC) of the received signaling message, a destination point code (DPC) of the received signaling message, a calling party address of the received signaling message, and a called party address of the received signaling message.

6. The method of claim 1 wherein the plurality of different GTT modes are arranged in a user defined hierarchy and wherein the method further comprises, in response to failing to locate a matching entry using the selected GTT mode, performing a GTT lookup according to a next GTT mode in the GTT hierarchy.

7. The method of claim 1 wherein the plurality of GTT modes includes an advanced called party GTT mode in which the GTT lookup is performed based on at least one of called party parameters, calling party parameters, and message transfer part (MTP) parameters in the signaling message.

8. The method of claim 7 wherein the plurality of GTT modes includes a calling party GTT mode where the GTT lookup is performed based on calling party parameters in the signaling message.

9. The method of claim 8 wherein the plurality of GTT modes includes a called party GTT mode where the GTT lookup is performed based on called party parameters in the signaling message.

10. A method for global title translation (GTT) in a telecommunications network, the method comprising:
    (a) receiving a signaling message that contains a global title address (GTA);
    (b) selecting a GTT mode from a plurality of different GTT modes based on an attribute of the received signaling message, wherein at least some of the different GTT modes use different combinations of address parameters associated with received signaling messages to search a GTT database, at least one of the GTT modes utilizing a GTT lookup parameter other than or in addition to a signaling connection control part (SCCP) called party address, wherein each of the different GTT modes translates at least a signaling connection control part (SCCP) parameter into at least a message transfer part (MTP) destination point code; and
    (c) searching the GTT database using a combination of address parameters of the received signaling message specific to the selected GTT mode.

11. The method of claim 10 wherein selecting a GTT mode from the plurality of GTT modes based on an attribute of the received signaling message includes selecting a GTT mode based on at least one of a message transfer part (MTP), a signaling connection control part (SCCP), and a transaction capabilities application part (TCAP) parameter in a signaling message.

12. The method of claim 10 wherein selecting a GTT mode includes selecting the GTT mode using at least one criterion separate from parameters in the signaling message.

13. The method of claim 10 comprising discarding the signaling message based on results of the search of the GTT database.

14. The method of claim 10 comprising copying the signaling message based on results of the search of the GTT database.

15. The method of claim 10 comprising generating an error message based on results of the search of the GTT database.

16. A system for global title translation (GTT) in a telecommunications network, the system comprising:
    (a) a communications link module for sending signaling messages to and receiving signaling messages from a network;
    (b) a GTT database; and
    (c) a global title translation engine operatively associated with the communications link module for receiving, from the communications link module, a signaling message that contains a global title address (GTA), for selecting, based on an attribute of the received signaling message, a GTT mode from a plurality of different GTT modes, wherein at least some of the different GTT modes use different combinations of parameters associated with received signaling messages to search a GTT database and for searching the GTT database using a combination of address parameters of the received signaling message specific to the selected GTT mode, wherein each of the different GTT modes translates at least a signaling connection control part (SCCP) parameter into at least a message transfer part (MTP) destination point code.

17. The system of claim 16 wherein the communications link module comprises an SS7 link interface module.

18. The system of claim 16 wherein the communications link module comprises an IP telephony signaling link interface module.

19. The system of claim 16 wherein the GTT engine is adapted to select a GTT mode from a plurality of different GTT modes based on at least one of an incoming linkset from which the signaling message is received and an address parameter of the received signaling message.

20. The system of claim 16 wherein the combinations of address parameters for searching the GTT database include at least one of: an incoming linkset of the received signaling message, and origination point code (OPC) of the received signaling message, a destination point code (DPC) of the received signaling message, a calling party address of the received signaling message, and a called party address of the received signaling message.

21. The system of claim 16 wherein the different GTT modes are ordered in a user defined hierarchy, wherein searching the GTT database using a combination of address parameters of the received signaling message specific to the selected mode includes performing the GTT lookup according to a most preferred mode in the hierarchy, and in response to failing to locate a matching entry using the most preferred mode, performing a lookup according to at least one lesser-preferred mode in the hierarchy.

22. The system of claim 16 wherein the plurality of different GTT modes include an advanced called party GTT mode in which the GTT lookup is performed based on at least one of calling party parameters, called party parameters, and message transfer part (MTP) parameters in the signaling message.

23. The system of claim 22 wherein the plurality of GTT modes includes a calling party GTT mode in which the GTT lookup is performed based on calling party parameters in the signaling message.

24. The system of claim 23 wherein the plurality of GTT modes includes a called party GTT mode in which the GTT lookup is performed based on a called party parameter in the signaling message.

25. A computer program product comprising computer-executable instructions embodied in a computer-readable medium for performing steps comprising:
(a) receiving a signaling message that contains a global title address (GTA);
(b) selecting a GTT mode from a plurality of different GTT modes based on an attribute of the received signaling message, wherein at least some of the different GTT modes use different combinations of address parameters associated with received signaling messages to search a GTT database, wherein each of the different GTT modes translates at least a signaling connection control part (SCCP) parameter into at least a message transfer part (MTP) destination point code; and
(c) searching the GTT database using a combination of address parameters of the received signaling message specific to the selected GTT mode.

26. The computer program product of claim 25 wherein receiving a signaling message includes receiving an SS7 signaling message.

27. The computer program product of claim 25 wherein receiving a signaling message includes receiving a signaling connection control part (SCCP) message.

28. The computer program product of claim 25 wherein selecting a GTT mode from a plurality of different GTT modes based on an attribute of the received signaling message includes selecting a GTT mode based on at least one of an incoming linkset of the received signaling message and an address parameter of the received signaling message.

29. The computer program product of claim 25 wherein searching the GTT database using a combination of address parameters of the received signaling message specific to the selected GTT mode includes searching the GTT database using at least one of: an incoming linkset of the received signaling message, an origination point code (OPC) of the received signaling message, a destination point code (DPC) of the received signaling message, a calling party address of the received signaling message, and a called party address of the received signaling message.

30. The computer program product of claim 25 wherein the plurality of different GTT modes are arranged in a predetermined hierarchy and wherein the method further comprises, in response to failing to locate a matching entry in the selected GTT mode, performing a GTT lookup according to a next GTT mode in the GTT hierarchy.

31. The computer program product of claim 25 wherein the plurality of GTT modes includes an advanced called party GTT mode in which the GTT lookup is performed based on at least one of called party parameters, calling party parameters, and message transfer part (MTP) parameters in the signaling message.

32. The computer program product of claim 31 wherein the plurality of GTT modes includes a calling party GTT mode where the GTT lookup is performed based on calling party parameters in the signaling message.

33. The computer program product of claim 25 wherein the plurality of GTT modes includes a called party GTT mode where the GTT lookup is performed based on called party parameters in the signaling message.

* * * * *